UNITED STATES PATENT OFFICE.

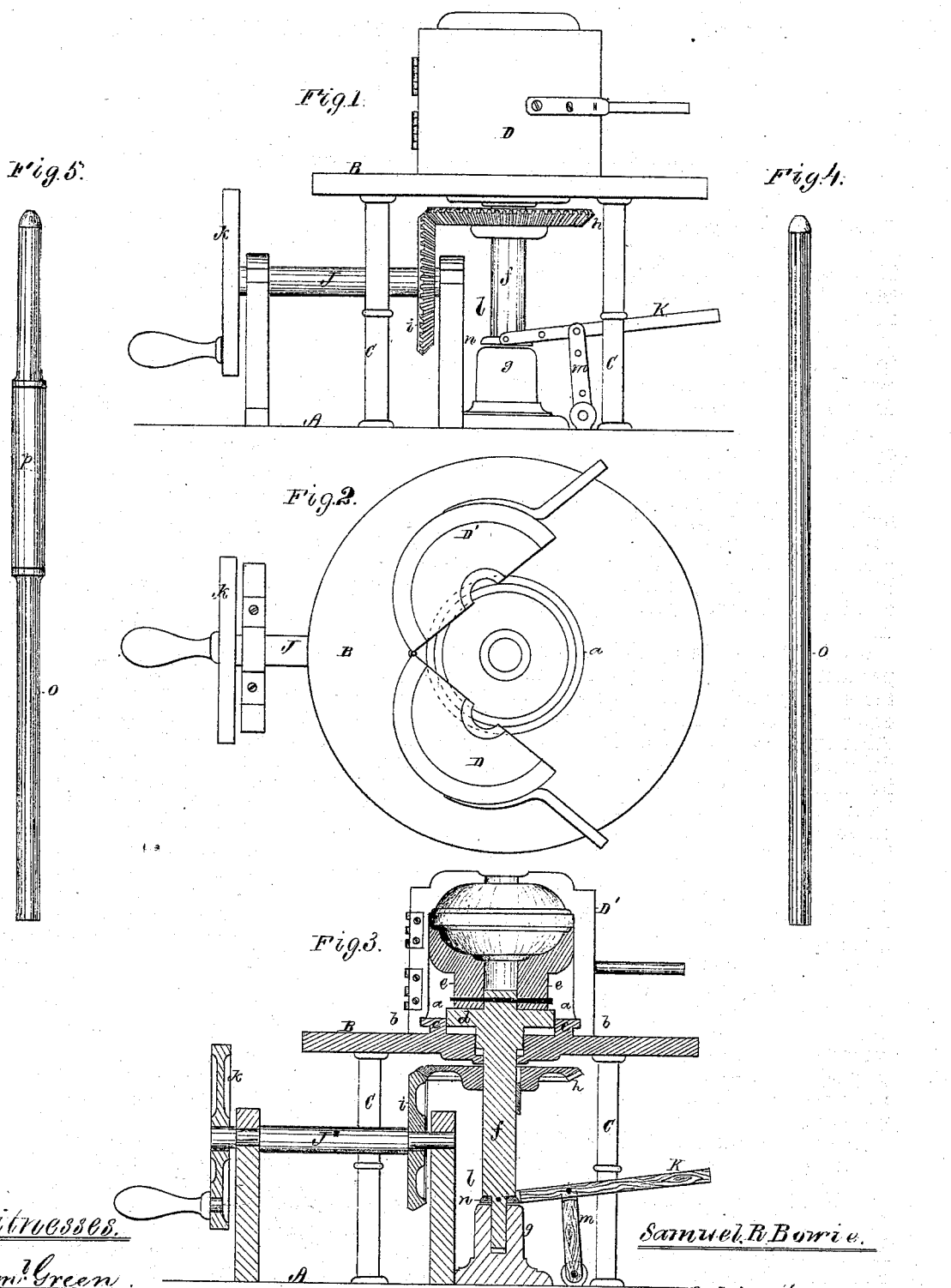

SAMUEL R. BOWIE, OF NEW BEDFORD, MASSACHUSETTS.

IMPROVEMENT IN GLASS-BLOWERS' MOLDS.

Specification forming part of Letters Patent No. 125,165, dated April 2, 1872.

*To all whom it may concern:*

Be it known that I, SAMUEL R. BOWIE, of New Bedford, in the county of Bristol and State of Massachusetts, have invented certain new and useful Improvements in Glass-Blowers' Molds; and do hereby declare the same to be fully described in the following specification and represented in the accompanying drawing, of which—

Figure 1 is a side elevation of a mold and its operating mechanism, as constructed in accordance with my invention; Fig. 2 is a top view, showing the mold supporting-plate and the mold, the latter being represented as open; Fig. 3 is a central, vertical, and longitudinal section of the apparatus; Fig. 4 exhibits a glass-blower's rod or tube, as ordinarily constructed, and Fig. 5 shows one of my improved construction.

My invention has special reference to the production of glass articles whose external surfaces are circular in horizontal section, whether such articles be of a globular, cylindrical, or other curvilinear form, and the mold for producing such may be of any desirable shape on its inner surface, provided the contour of such be made up of a series of circles generated by a series of concentric radiuses. The object of my invention is to produce a simple and effective apparatus or machine whereby not only the outer surface of glass articles may have a smooth and uniform exterior imparted to them with great facility and dispatch while the glass is being blown, but enable the operator or glass-blower during such process to give the articles a more uniform and even thickness than has heretofore been attained; and my invention consists in the employment of a movable or rotary table or bed-plate, upon which the molten glass rests, and is moved or rotated during the process of being blown, in combination with a stationary matrix or mold, the glass being held to the said plate and moved or rotated thereby against the walls of the mold, whereby a smooth and uniform exterior is given to the outer surface of the article. And my invention further consists in the employment, with the mold or walls thereof, of a table or bottom-former, capable of being moved axially for the purpose of giving a greater uniformity of thickness in those articles whose height is small in comparison to their diameter.

It is a fact well known that in forming blown-glass articles in stationary iron molds, as heretofore constructed and employed, that a seam or ridge is produced in the article molded at each joint of the mold, such not only marring the appearance of the molded article and lessening its marketable value, but impairing its light-transmitting property, when such articles are used for the transmission or diffusion of light. With molds so formed—that is, with a stationary bed-plate to support and form the bottom of the glass article, and with a stationary matrix made in halves or sections to form the sides and top thereof—it has been, and still is, impossible to avoid the formation of ridges or seams on the outer surface of the articles. Owing to the adhesion of the molten glass both to the bed-plate or bottom-former and the walls of the mold, the glass-blower was unable to turn his tube without twisting the neck of the glass.

To overcome this difficulty I have formed the bed-plate or bottom on which the glass is held while being blown movable, so as to rotate and have a positive movement, independent of any movement thereof by the glass-blower, whereby I am enabled to rotate the glass while being blown out against the walls of the stationary matrix, and thus impart a smooth and even surface to the exterior of the glass.

In the drawing, A denotes the base-plate or foundation of the machine. B is a circular table supported upon four pillars or standards, C C C C, extending up from the base A. On the said table the two halves or sections, D D', of the mold are mounted, the same being hinged together and provided with handles for opening and closing them. The said mold is connected and secured to the said table by means of an annular flange, $a$, formed on the external surface of a hub or boss, $c$, projecting upward from the table, and a corresponding-shaped groove, $b$, made in the inner surface of the mold. $d$ is a small disk or table to receive and support a bottom-former or plate, $e$, which may be one of a series of any desirable shape. The said table is affixed to a shaft or spindle, $f$, which extends down through a hole made axially through the table B, and is stepped in a support, $g$, extending up from the base A, as shown in Figs. 1 and 3. $h$ is a bevel-gear, which is disposed upon the spindle $f$, and engages with another bevel-gear, $i$, affixed upon one end of the main driving-shaft $j$, to whose other end a wheel, $k$, is affixed, the latter carrying a crank or winch by which rotary motion may be imparted to the said shaft, and consequently to the bottom-former e.

All the parts of the apparatus may be made of iron, but I prefer to make the mold or parts D D' of soap-stone, as it is not only more easily wrought, but gives the mold an unctuous quality not incident to iron.

In forming the glass article, the rotary table or bottom-former first receives the molten glass and supports it while the glass-blower is inflating or blowing the glass against the walls of the mold. This table may have a continuous or a partial or semi-rotation, as may be desirable. Furthermore, the said gear $h$ is so connected with the spindle $f$ as to enable the spindle, and thereby the bottom-former or plate $e$, to be moved axially or vertically, more or less, as may be requisite, in order to give a greater uniformity of thickness to the glass article when fromed than could otherwise be effected. This vertical or axial movement of the bottom-former is of great value in forming shallow glass articles, whose lateral expansion under the action of the blow-pipe is greatly in excess of that in the direction of their depth or height. To attain such uniformity the bottom-former is first depressed a short distance, in order to enable the glass-blower to give the ovoidal plastic mass a length greater than the article is to have when formed. Having blown the glass out its entire length and partially inflated it, he next raises the bed-plate or bottom-former to the desired height, thus causing the plastic mass to be compressed or crowded together and assume an oblate spheroidal shape, when the glass-blower next inflates or blows the compressed glass against the walls of the mold.

The mechanism for effecting the elevation of the bottom-former consists of the lever $k'$, having its fulcrum affixed to a projection or support, $m$, as shown in Figs. 1 and 3. The inner furcated end of the said lever has an annular collar, $n$, pivoted thereto and embracing the spindle $f$, and has its top surface resting against a shoulder, $l$, formed on the said spindle. Another shoulder, or other suitable device may be formed on or affixed to the spindle, under the said collar, to enable the lever to depress the spindle and bed whenever desirable.

Fig. 5 shows an improved construction of a glass-blower's rod or pipe, which consists of the ordinary rod or tube, shown in Fig. 4, provided with a sleeve so applied thereto as to enable the pipe to freely rotate therein.

In forming a glass article with my improved mold or apparatus, the glass-blower, having gathered the requisite amount of molten glass upon the end of his pipe, manipulated, marved, and formed it into a hollow, pear-shaped mass in the usual manner, deposits it upon the central part of the bed-plate or bottom-former; the two halves or parts D D' are next closed, the glass-blower maintaining the rod or pipe in a vertical position by grasping the same or the sleeve thereof with one hand, while with the other he imparts a rotation to the pipe; commences to blow and inflate the glass in the ordinary manner; rotary motion being imparted to the said bed or bottom-former by means of mechanism, as hereinbefore described, or any other suitable for the purpose, a smooth and even surface will be given to the exterior of the molded article.

I would remark, that a stationary mouth-piece may be applied to the outer end of the blow-pipe, such being connected with the sleeve by two or more wires.

I would further remark that I intend to apply a gear to the blow-pipe, and so connect the same by suitable devices to the gear on the main driving-shaft that a positive-like revolution shall be imparted both to the pipe and the bottom-former.

So also a series of rollers, fixed on a stationary shell, may be employed with the movable bed, but such greatly increases the cost of the mold, without producing any compensating advantage.

Having described my invention, what I claim is—

1. The movable or rotary bed-plate or bottom-former $e$, in combination with a stationary mold or parts D D', substantially as and for the purpose hereinbefore set forth.

2. A mold for forming the outer surface of a blown-glass article, as made with an axially adjustable bed-plate or bottom-former, substantially as and for the purpose hereinbefore specified.

SAMUEL R. BOWIE.

Witnesses:
F. P. HALE,
F. C. HALE.